Feb. 19, 1946.    J. V. HORR    2,395,122
DISPLAY DEVICE
Filed Feb. 15, 1945    2 Sheets-Sheet 1
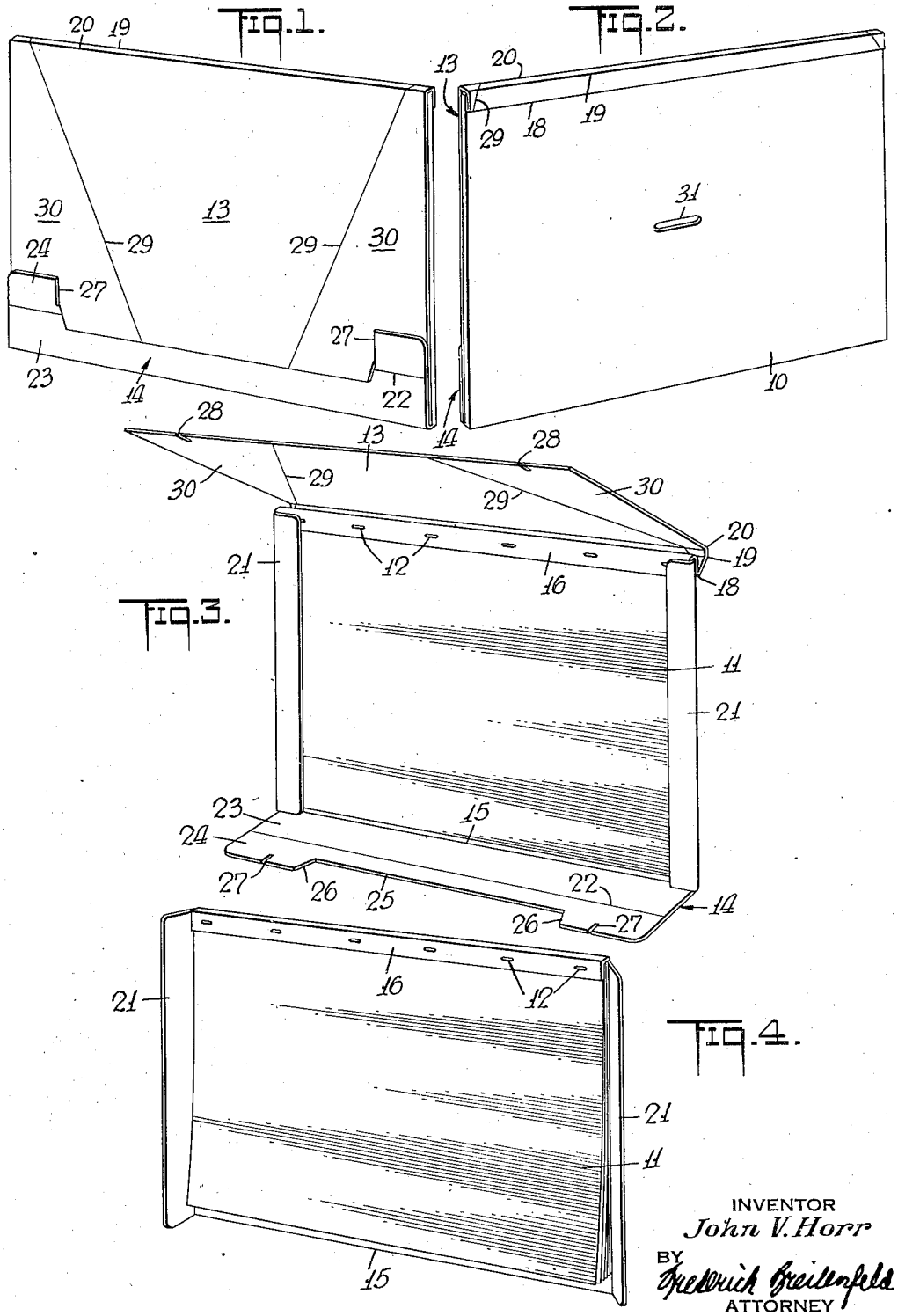
INVENTOR
John V. Horr
BY
Frederick Breitenfeld
ATTORNEY Feb. 19, 1946.  J. V. HORR  2,395,122
DISPLAY DEVICE
Filed Feb. 15, 1945    2 Sheets-Sheet 2
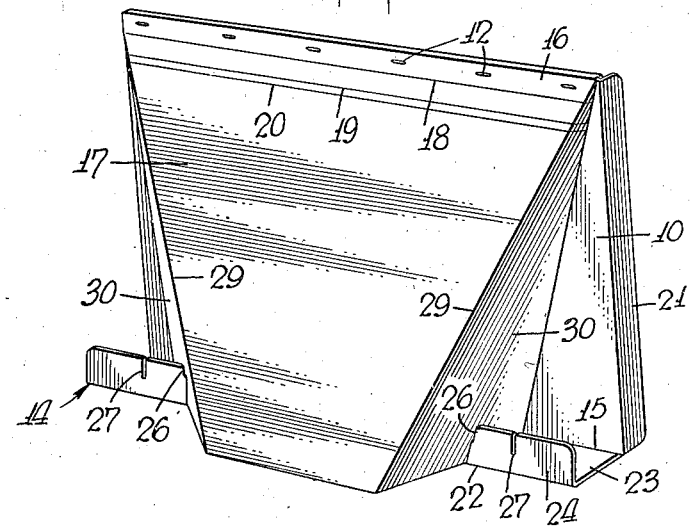
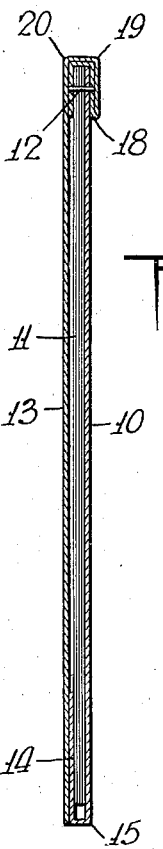
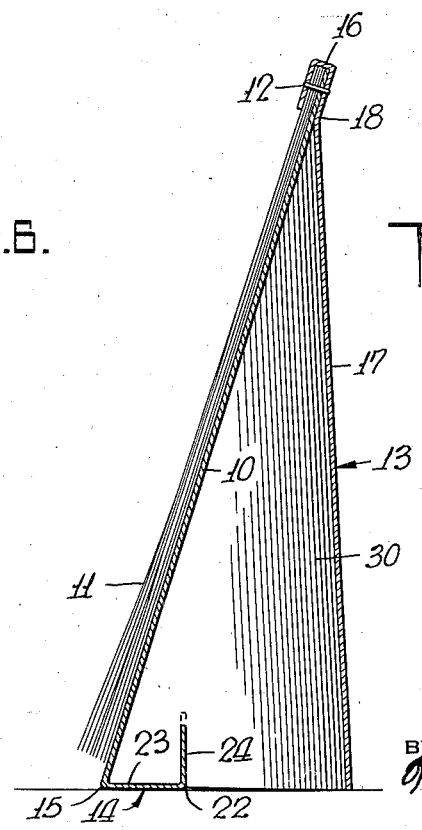
INVENTOR
John V. Horr
BY
Frederick Breidenfeld
ATTORNEY Patented Feb. 19, 1946

2,395,122

UNITED STATES PATENT OFFICE 2,395,122

DISPLAY DEVICE

John V. Horr, North Tarrytown, N. Y., assignor to Einson-Freeman Co., Inc., Long Island City, N. Y., a corporation of Delaware Application February 15, 1945, Serial No. 578,106

2 Claims. (Cl. 40—152.1)

My present invention relates generally to display devices.

A general object of the invention is to provide an improved structure by means of which a display unit may be conveniently and safely transported from place to place, and may be effectively exhibited, when desired, on an easel-like support. The present structure is so designed that the element or elements of which it is composed will normally serve as a compact and secure enclosure for the display unit, and may be adjusted, when desired, to define a rugged supporting structure in the form of a display easel. The structure is preferably composed of one or more elements of flat stock such as relatively stiff cardboard or the like.

While certain phases of my invention are not necessarily restricted to any particular type of use, the construction is primarily intended and is peculiarly adapted for the transportation and exhibition of a display unit which consists of a series of posters of educational or informative character. For example, the present device has proven to be particularly useful in the transportation and display, to members of the armed forces in the field, of posters of substantial size, e. g., about three feet in width and four feet in length, or larger.

One of the objects of the invention is to provide a structure which is composed of a minimum number of parts, which is so designed that it may be manufactured at extremely low cost, and easy to adjust into and out of a display-exhibiting condition.

The structure consists essentially of a backing on which the display unit is arranged, and a cover which normally overlies the display unit. The backing and cover are of relatively stiff cardboard or the like, and normally define a compact substantially flat enclosure which conceals and protects the display unit and permits it to be readily transported from place to place. The cover preferably comprises two sections which are hingedly connected, respectively, to the upper and lower margins of the backing. These margins are straight, so that the two sections of the cover are swingable to a rear position behind the backing when the display unit is uncovered.

One of the features of my invention lies in the provision of a means for interlocking the cover sections when they are in their rear positions, thereby defining a prop which supports the backing as as inclined easel for the uncovered display unit. Other features of the present construction reside in the special design of the cover sections whereby they are better enabled to fulfill the dual function of covering and concealing the display unit when the device is closed, and supporting the structure as a display easel when the display unit is exhibited.

I achieve the foregoing objects and advantages, and such other objects and advantages as may hereinafter appear or be pointed out, in the manner illustratively exemplified in the accompanying drawings in which:

Figure 1 is a perspective view of a display device of the present character, shown in closed condition and viewed from the front;

Figure 2 is a view similar to Figure 1, showing the appearance of the closed device when viewed from the rear;

Figure 3 is a view similar to Figure 1 with the cover sections partially thrown back;

Figure 4 is a view similar to Figure 3 with the cover sections swung completely to the rear to uncover the display unit;

Figure 5 is a perspective view of the display device, in set-up condition, as viewed from the rear;

Figure 6 is a vertical cross-sectional view of the structure when in closed condition, certain parts being exaggerated in thickness for the sake of clarity; and Figure 7 is a view similar to Figure 6, taken in the same direction, and showing the parts in adjusted relationships which they assume when the device is set up.

The display device which I have chosen for illustrative purposes comprises a substantially rectangular backing 10 having straight parallel upper and lower margins and substantially parallel sides. Mounted on it is a display unit 11 which assumes the form of a stack of posters composed of paper or similar relatively flexible sheet material. The stack is secured as a unit to the upper margin of the backing 10 by means of staples 12, although any equivalent fastening instrumentality may be used.

Associated with the backing 10 is a cover comprising two sections 13 and 14, each of these sections being composed of flat sheet stock, such as relatively stiff cardboard or the like. The section 14 is relatively short and is hinged to the lower margin of the backing 10. In the illustrated embodiment of the invention, I have shown the section 14 formed as an integral extension of the backing 10, the hinge line being designated by the reference numeral 15. The section 13 is relatively long and is hingedly connected to the upper margin of the backing 10. The section 13 is most conveniently constructed of a separate element of sheet material and is preferably associated with the backing in the manner shown most clearly in Figures 6 and 7. In these figures I have shown how the element 13 is scored and shaped to define a substantially U-shaped end portion 16, and a main or body portion 17 hinged thereto along the line 18. The U-shaped end portion 16 engages around the upper margins of the backing 10 and the display stack 11, and is preferably held in place by means of the staples 12 previously mentioned. The body portion 17 is provided with suitable score lines in the regions 19 and 20 (see Figure 6) to facilitate its adjustment between the two positions shown in Figures 6 and 7.

Upon reference to Figures 3 and 4, it will be observed that the backing 10 is also preferably provided at its side edges with hinged extensions 21 which may be turned inwardly to lie over the display unit 11 when the device is closed, and may be swung outwardly (Figure 4) when the display unit is to be exhibited.

As shown most clearly in Figure 3, the cover section 14 is provided with a longitudinal hinge line 22 which divides this section into a main portion 23 and a hinged outer portion or flap 24. The free edge of the flap is cut away as at 25 to define the opposed shoulders 26, the purpose of which will be presently described. The free edge of the flap 24 is also preferably provided with slits or notches 27.

The cover section 13 is provided at its free edge with slits or notches 28, and is also provided with oblique score lines 29 which define lateral wings 30. Each of these wings is substantially triangular, the apex of the triangle lying closely adjacent to the upper margin of the backing 10.

When the device is in its closed condition, the display unit 11 lies flat against the backing 10, the side extensions 21 are turned inwardly, and the cover sections 13 and 14 lie flatwise over the display unit as shown in Figures 1 and 6. The two portions of the section 14, i. e., the main portion 23 and the flap 24, lie in a substantially single plane; and similarly, the wing portions 30 of the cover section 13 lie in the same plane as the main or body portion 17 of this section. An interengagement of the notches 27 and 28 holds the two cover sections in an interlocked engagement. In this condition, the device is a convenient compact structure which may be readily transported from place to place, the act of carrying the device being facilitated by the provision of a finger opening 31 in the midportion of the backing 10 (see Figure 2).

When the device is to be set up as a display easel, for the purpose of exhibiting the display unit, the sections 13 and 14 are disengaged from each other, and each of them is swung upwardly and around until it assumes the position behind the backing 10. The first step during this opening procedure is indicated in Figure 3.

When the section 14 is swung rearwardly, the main portion 23 is caused to lie substantially flat (Figures 5 and 7) while the flap 24 is adjusted into an upright disposition. The upper section of the cover is folded along the oblique hinge lines 29 so that the wings 30 are adjusted out of the plane of the main or body portion 17. The notches 28 are then engaged with the upstanding flap 24 adjacent to the shoulders 26 (see Figure 5) and this interlocks the wings 30 with the upstanding flap 24 in crosswise relation to the latter. The resultant structure defines a rear prop of considerable rigidity which serves to hold the backing 10 in an inclined easel-like position. The display unit may then be exhibited to an audience, and in the case of a series of stacked posters, one poster after another may be displayed and described, and may then be swung upwardly and rearwardly across the top of the device to uncover the poster beneath.

After the exhibit has been completed, the parts are easily adjusted into their normal relationship by a reversal of the procedure mentioned.

One of the outstanding advantages of the present device lies in the fact that the parts are simple in nature and few in number, and are so designed that the two cover sections may be interlocked either at the front of the device (Figures 1 and 6) or at the rear of the device (Figures 5 and 7) without recourse to any extraneous fastening instrumentalities. When the device is in its closed condition, the fact that the hinge lines 29 intersect the hinge lines 18, 19 and 20 results in holding the upper cover section in the desired flat condition. When the device is in the set-up condition indicated in Figures 5 and 7, a rigid prop is afforded by virtue of the unique adjustment of the upper cover section and its interengagement with the securing means carried by the lower margin of the backing.

It will be understood, of course, that the details herein described and illustrated are intended to be merely illustrative, except as they may be otherwise specifically referred to in the appended claims.

Having thus described my invention and illustrated its use, what I claim as new and desire to secure by Letters Patent is:

1. In a portable display device of the character described, a flat backing having straight upper and lower margins, a display unit mounted on said backing and a cover adapted to overlie said display unit when the device is closed, said cover comprising two flat sections hingedly connected to said upper and lower margins, respectively, each section being swingable to a rear position behind said backing when the display unit is uncovered, the lower section being provided with a hinged flap adapted to be adjusted into an upright disposition when said section is in its rear position, the upper section being provided with hinged lateral wings whose end portions are adapted to engage with said flap in cross-wise relation thereto, whereby said sections may be interlocked to define a rear prop which supports the backing as an inclined easel for said uncovered display unit.

2. In a display device, the combination of elements set forth in claim 1, said wings being substantially triangular with the apex of each triangle adjacent to the upper margin of said backing.

JOHN V. HORR.